United States Patent
Wang et al.

(10) Patent No.: US 9,368,252 B2
(45) Date of Patent: Jun. 14, 2016

(54) METHOD FOR FORMING VAPOR GROWN GRAPHITE FIBERS COMPOSITION AND MIXTURE FORMED BY THE SAME AND APPLICATIONS THEREOF

(71) Applicant: YONYU APPLIED TECHNOLOGY MATERIAL CO., LTD., Tainan (TW)

(72) Inventors: Chun-Shan Wang, Tainan (TW); Teng-Hui Wang, Tainan (TW)

(73) Assignee: YONYU APPLIED TECHNOLOGY MATERIAL CO., LTD., Tainan (TW)

( * ) Notice: Subject to any disclaimer, the term of this patent is extended or adjusted under 35 U.S.C. 154(b) by 219 days.

(21) Appl. No.: 14/207,524

(22) Filed: Mar. 12, 2014

(65) Prior Publication Data

US 2014/0191166 A1    Jul. 10, 2014

Related U.S. Application Data

(63) Continuation-in-part of application No. 13/650,142, filed on Oct. 12, 2012, now abandoned.

(30) Foreign Application Priority Data

Aug. 13, 2012 (TW) .............................. 101129212 A

(51) Int. Cl.

| | |
|---|---|
| *H01B 1/24* | (2006.01) |
| *C01B 31/04* | (2006.01) |
| *C08L 63/00* | (2006.01) |
| *D01F 9/127* | (2006.01) |
| *H01B 1/04* | (2006.01) |
| *B82Y 30/00* | (2011.01) |
| *B82Y 40/00* | (2011.01) |

(52) U.S. Cl.
CPC *H01B 1/24* (2013.01); *C01B 31/04* (2013.01); *C08L 63/00* (2013.01); *D01F 9/127* (2013.01); *H01B 1/04* (2013.01); *B82Y 30/00* (2013.01); *B82Y 40/00* (2013.01)

(58) Field of Classification Search
CPC ........ C01B 31/04; B82Y 30/00; B82Y 40/00; D01F 9/127
See application file for complete search history.

(56) References Cited

U.S. PATENT DOCUMENTS

| | | | | |
|---|---|---|---|---|
| 7,550,130 B2* | 6/2009 | Wang | ..................... | B82Y 30/00 423/447.1 |
| 2010/0021794 A1* | 1/2010 | Kim | ....................... | D01D 5/003 429/509 |
| 2012/0321544 A1* | 12/2012 | Takai | ..................... | B01J 23/745 423/447.3 |

FOREIGN PATENT DOCUMENTS

| | | |
|---|---|---|
| CN | 1820097 A | 8/2006 |
| TW | 583153 | 4/2004 |
| TW | 200508149 | 3/2005 |
| TW | 201223767 A1 | 6/2012 |

* cited by examiner

*Primary Examiner* — Richard M Rump
(74) *Attorney, Agent, or Firm* — CKC & Partners Co., Ltd.

(57) ABSTRACT

A method for forming a vapor-grown graphite fibers (VGGF) composition and a VGGF composition formed by the method are provided. In this method, a transition metal compound catalyst and three organic co-catalysts are mixed with a hydrocarbon compound, and then are delivered into a tubular reactor and pyrolized and graphitized to produce the VGGF composition. The VGGF composition includes a carbon ingredient containing a carbon content of at least 99.9 wt %. The carbon ingredient has a graphitization degree of at least 75%, and the carbon ingredient includes non-fibrous carbon and fibrous VGGF, wherein an area ratio of the non-fibrous carbon to the fibrous VGGF is about equal to or smaller than 5%. The fibrous VGGF include graphite fibers having a 3-D linkage structure, wherein the content of the graphite fibers having the 3-D linkage structure in the fibrous VGGF is about between 5 area % and 50 area %.

11 Claims, 5 Drawing Sheets

METHOD FOR FORMING VAPOR GROWN GRAPHITE FIBERS COMPOSITION AND MIXTURE FORMED BY THE SAME AND APPLICATIONS THEREOF

CROSS-REFERENCE TO RELATED APPLICATION

This application is a continuation-in-part of U.S. application Ser. No. 13/650,142 filed Oct. 12, 2012, which claims priority to Taiwan Application Serial Number 101129212, filed Aug. 13, 2012. The entire disclosures of all the above applications are hereby incorporated by reference herein.

BACKGROUND

1. Field of Invention

The present invention relates to a method for forming graphite fibers composition and mixtures formed thereby. More particularly, the present invention relates to a method for forming a vapor-grown graphite fibers (VGGF) composition and a mixture containing the VGGF composition formed thereby and applications thereof.

2. Description of Related Art

Recently, with the advance of information, communication, computer and energy industries, electronic products are developed towards the directions of smaller size and higher performance. A conventional skill often adds non-fibrous carbon black to a material such as plastic, rubber etc., thereby promoting thermal conductivity and electrical conductivity of the material. The non-fibrous carbon black is particulate, and thus has to be added in a large amount so as to have some effect on the performance of the material. However, the large amount of carbon black addition has caused the composite material to have inferior physical properties and easy decarburization, thus resulting in contamination problem at a clean room.

Another conventional skill adopts polyacrylonitrile (PAN)-based carbon fibers and pitch-based carbon fibers instead of carbon black. Although these carbon fibers are of continuity, yet their diameters are so large (greater than 10 μm), that the number of networks which can be formed in the composite material is limited, and a large amount of carbon fibers are still needed to have some effect on performance of the composite material, thus still causing the composite material to have the problems of inferior physical properties and easy decarburization.

In order to resolve the aforementioned problems, another conventional skill uses vapor-grown carbon fibers (VGCF) of relatively small diameters to replace the non-fibrous carbon black and the carbon fibers. Since the diameters of the VGCF are quite small (about 50 nm to 200 nm), only a small amount of VGCF is needed to form many continuous networks in the composite material, thus not causing the composite material to have the problems of inferior physical properties and easy decarburization, and maintaining the cleanness of a clean room. In addition, since having the characteristics of excellent thermal and electrical conductivities, and high strength etc., the VGCF have effectively promoted the performance of the composite material. However, the conventional VGCF contains too much non-fibrous carbon which cannot be removed by graphitization, thus decreasing the number of continuous networks to be constructed in the composite material to affect the performance of the composite material. Further, the conventional VGCFs are generally formed in one-dimensional structures which construct much less continuous networks in comparison with three-dimensional VGCFs, and fail to promote strength, thermal and electrical conductivity performances of the composite material as much as expected. Also, since not being highly graphitized, the metal catalyst used in the production of conventional VGCF has not been removed to be within a proper range, which has caused a detrimental effect on electrochemical reaction to be applied in the field of energy, for example, has limited efficacy in promoting the power and cycle life of a battery.

Hence, there is a need to provide an in-situ method to produce a VGGF (vapor-grown graphite fibers) composition with more three-dimensional linkage structures, less non-fibrous carbon, less metal content and a mixture thereof for solving the problems of the conventional VGCF.

SUMMARY

An aspect of the present invention is to provide a method for forming a VGGF composition for improving the substantial problems of the conventional VGCF which are generally formed in one-dimensional structures and contain too much non-fibrous carbon and metal content (impurities).

In one embodiment, in the method for forming the VGGF composition, a liquid raw material is prepared by mixing a hydrocarbon compound, a transition metal compound catalyst and a co-catalyst mixture comprising a coordinating ligand containing a keto-enol tautomerism, an organic compound containing a polysulfide group, a bicyclic organic compound containing nitrogen. The liquid raw material is vaporized to form raw material gas, and then the raw material gas and hydrogen gas are introduced into a tubular reactor for performing a pyrolysis reaction, thereby producing a vapor-grown carbon fibers (VGGF) with more three-dimensional linkage structures and less non-fibrous carbon. Thereafter, a high-temperature graphitization treatment is performed on the VGCF, thereby forming the VGGF composition.

In another embodiment, the hydrocarbon compound is selected from the group consisting of an aliphatic hydrocarbon compound, an aromatic hydrocarbon compound and a combination thereof, and the aliphatic hydrocarbon is selected from the group consisting of methane, ethylene, styrene, acetylene, propane, liquefied petroleum gas, butane, butene, butadiene and a combination thereof, and the aromatic hydrocarbons is selected from the group consisting of benzene, toluene, xylene, styrene and a combination thereof.

In another embodiment, the transition metal compound catalyst is selected from the group consisting of ferrocene $(Fe(C_5H_5)_2))$, nickelocene $(Ni(C_5H_5)_2)$, cobaltocene $(Co(C_5H_5)_2)$ and a combination thereof.

In another embodiment, the transition metal compound catalyst is ferrocene, and the content of the transition metal compound catalyst in the liquid raw material is substantially between 0.1 wt % and 10 wt %.

In another embodiment, the coordinating ligand containing the keto-enol tautomerism has a molecular structure of the following formula.

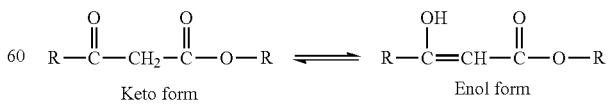

where R is an alkyl group of C1~C6.

In another embodiment, the coordinating ligand containing the keto-enol tautomerism is ethyl 3-oxobutanoate, and the content of the coordinating ligand containing the keto-enol tautomerism in the liquid raw material is substantially between 0.5 wt % and 5 wt %.

In another embodiment, the organic compound containing the polysulfide group has a molecular structure containing at least three sulfur atoms.

In another embodiment, the organic compound containing the polysulfide group is Bis(dimethylthiocarbamyl)sulfide, and the content of the organic compound containing the polysulfide group in the liquid raw material is substantially between 0.1 wt % and 2 wt %.

In another embodiment, the bicyclic organic compound containing nitrogen has a molecular structure containing at least one nitrogen atom.

In another embodiment, the bicyclic organic compound containing nitrogen is Triethylenediamine, and the content of the bicyclic organic compound containing nitrogen in the liquid raw material is substantially between 0.1 wt % and 2 wt %.

In another embodiment, a reaction temperature of the pyrolysis reaction is substantially between 800° C. and 1300° C.

In another embodiment, a graphitization temperature of the high-temperature graphitization treatment is substantially between 2800° C. and 3000° C.

The VGGF composition includes a carbon ingredient with a carbon content of at least 99.9 wt %, wherein the carbon ingredient has a graphitization degree of at least 75%, preferably at least 85%. The carbon ingredient includes fibrous VGGF and non-fibrous carbon, wherein an area ratio of the non-fibrous carbon to the fibrous VGGF measured by a scanning electron microscopy (SEM) is substantially equal to or smaller than 5%. The fibrous VGGF includes graphite fibers having three-dimensional (3-D) linkage structures, wherein the content of the graphite fibers having the 3-D linkage structures in the fibrous VGGF measured by a scanning electron microscopy (SEM) is substantially between 5 area % and 50 area %, which is substantially equivalent to between 5 wt % and 50 wt %.

In another embodiment, an averaged outer diameter of the aforementioned fibrous VGGF is in a range substantially between 50 nm and 200 nm, and an averaged aspect ratio of the fibrous VGGF is in a range substantially between 10 and 5000. When a thermogravimetric analyzer (TGA) is used for analysis under test conditions including a temperature increasing rate of 10° C./min and an air flow rate ranged between 10 ml/min and 20 ml/min, a thermal decomposition onset temperature of the VGGF composition is substantially greater than 700° C. The VGGF composition has a water content of substantially less than 0.2 wt %. The VGGF composition has a metal content of substantially less than 200 ppm.

According to an embodiment of the present invention, the aforementioned non-fibrous carbon is connected to, overlapped with or separated from the fibrous VGGF.

According to an embodiment of the present invention, the aforementioned VGGF composition includes an elongated hollow multi-layered structure formed by wrapping graphite having a carbon hexagonal net plane.

Another aspect of the present invention is to provide a mixture including a resin or an inorganic member and the aforementioned VGGF composition.

According to an embodiment of the present invention, a mixture of the aforementioned VGGF composition and N-Methyl-2-pyrrolidone (NMP) has a volume resistance of substantially smaller than 50 Ω-cm, wherein the content of the VGGF composition in the mixture is substantially 30 wt %. In one embodiment, the mixture further includes a resin or an inorganic member.

Another aspect of the present invention is to provide various applications of the VGGF composition, such as a lithium ion battery electrode material, a fuel cell material, an electrically-conductive composite material, a thermally-conductive composite material, a composite material with mechanical strength, etc., wherein those materials may include the mixture of the VGGF composition and a resin or an inorganic member.

It can be known from the aforementioned embodiments that the applications of the VGGF composition and the mixtures including the VGGF composition may greatly increase the number of networks constructed by the VGGF composition in a composite material, minimize the detrimental effect of impurities (non-fibrous carbon, water content and metal content), and greatly improve the performance of the composite material including electrical and thermal conductivities and strength.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
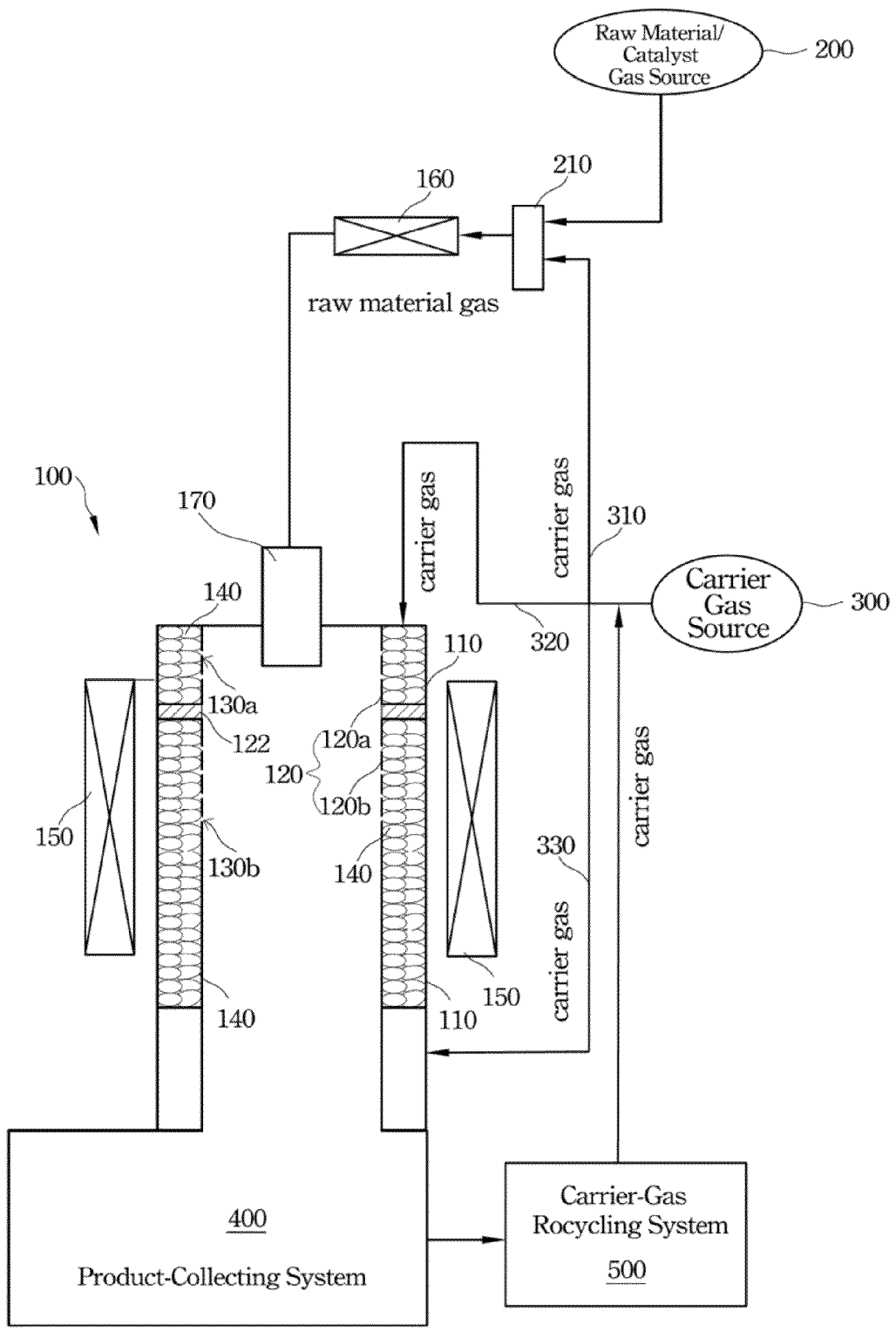
FIG. 1 is a schematic diagram showing a conventional VGCF reaction apparatus used in embodiments of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention provide a method for forming a VGGF composition for improving the substantial problems of the conventional VGCF which are generally formed in one-dimensional structures and contain too much non-fibrous carbon and metal content (impurities). In the method for forming the VGGF composition, a liquid raw material is prepared by mixing a hydrocarbon compound, a transition metal compound catalyst and a co-catalyst mixture comprising a coordinating ligand containing a keto-enol tautomerism, an organic compound containing a polysulfide group, a bicyclic organic compound containing nitrogen. The liquid raw material is vaporized by using such as a preheater, thereby forming raw material gas, and then the raw material gas and hydrogen gas are introduced into a tubular reactor for performing a pyrolysis reaction (about 800° C. to about 1300° C.), thereby producing a vapor-grown carbon fibers (VGCF) with more three-dimensional linkage structures and less non-fibrous carbon. Thereafter, a high-temperature graphitization treatment (about 2800° C. to about 3000° C.) is performed on the VGCF, thereby forming the VGGF composition.

The hydrocarbon compound may be an aliphatic hydrocarbon compound, an aromatic hydrocarbon compound or a combination thereof, and the aliphatic hydrocarbon may be methane, ethylene, styrene, acetylene, propane, liquefied petroleum gas, butane, butene, butadiene or a combination thereof, and the aromatic hydrocarbons may be benzene, toluene, xylene, styrene and a combination thereof. However, embodiments of the present invention are not limited thereto.

The transition metal compound catalyst may be ferrocene $(Fe(C_5H_5)_2)$, nickelocene $(Ni(C_5H_5)_2)$, cobaltocene $(Co(C_5H_5)_2)$ or a combination thereof. In one embodiment, the transition metal compound catalyst is ferrocene, and the content of the transition metal compound catalyst in the liquid raw material is substantially between 0.1 wt % and 10 wt %. However, embodiments of the present invention are not limited thereto.

The coordinating ligand containing the keto-enol tautomerism has a molecular structure of Formula (1) and the chelation of the coordinating ligand with the $Fe^{3+}$ is shown as Formula (2).

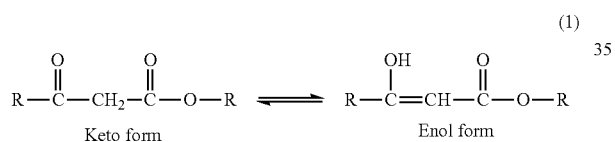

where R is an alkyl group of C1~C6.

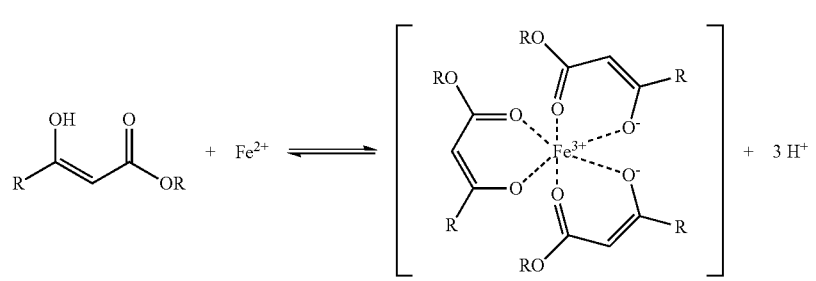

The compounds with the molecular structure of Formula (1) can be such as ethyl 3-oxobutanoate, methyl acetoacetate, allyl acetoacetate, ethyl benzoylacetate, ethyl 3-oxo-3-m-tolylpropanoate, p-nitro benzoylacetoacetate, ethyl-4-cloro-acetoacetate, ethyl 4,4-trifluoroacetoacetate, diethyl 3-oxoglutarate, diethyl 2-oxobutanedioate, tert-butyl acetoacetate, ethyl propionylacetate. In one embodiment, the coordinating ligand containing the keto-enol tautomerism is ethyl 3-oxobutanoate, and the content of the coordinating ligand containing the keto-enol tautomerism in the liquid raw material is substantially between 0.5 wt % and 5 wt %.

The organic compound containing the polysulfide group has a molecular structure containing at least three sulfur atoms. In one embodiment, the organic compound containing the polysulfide group is bis(dimethylthiocarbamyl) sulfide containing three sulfur atoms shown in Formula (3), and the content of the organic compound containing the polysulfide group in the liquid raw material is substantially between 0.1 wt % and 2 wt %.

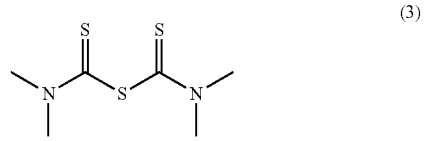

In another embodiment, the organic compound containing the polysulfide group is bis(dimethylthiocarbamyl)disulfide containing four sulfur atoms shown in Formula (4).

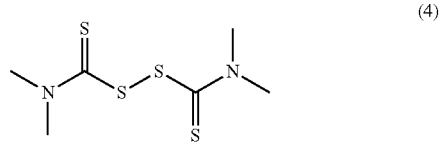

In another embodiment, the organic compound containing the polysulfide group is 2,2'-dithiobis(benzothiazole) containing four sulfur atoms shown in Formula (5).

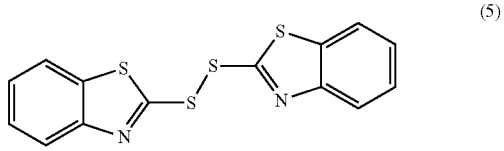 [SMILES: c1ccc2sc(SSc3nc4ccccc4s3)nc2c1]

In another embodiment, the organic compound containing the polysulfide group is bis(pentamethylene)thiuram tetrasulfide containing six sulfur atoms shown in Formula (6).

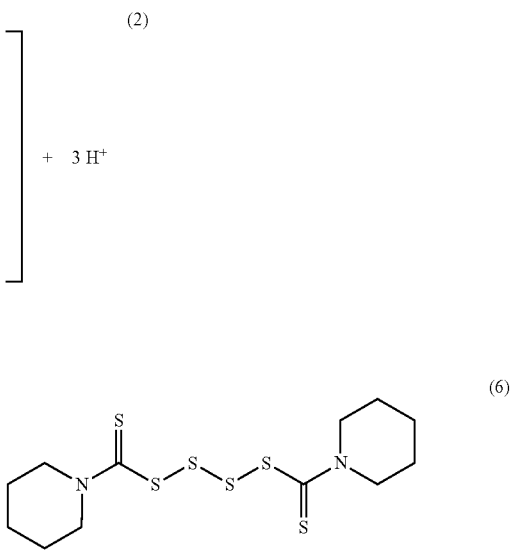

The bicyclic organic compound containing nitrogen has a molecular structure containing at least one nitrogen atom. In one embodiment, the bicyclic organic compound containing nitrogen is 1-azabicyclo[2.2.2]octane containing one nitrogen atom shown in Formula (7).

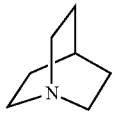
(7)

In another embodiment, the bicyclic organic compound containing nitrogen is triethylenediamine containing two nitrogen atoms shown in Formula (8), and the content of the bicyclic organic compound containing nitrogen in the liquid raw material is substantially between 0.1 wt % and 2 wt %.

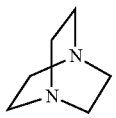
(8)

In another embodiment, the bicyclic organic compound containing nitrogen is 1,5-diazabicyclo[4.3.0]non-5-ene containing two nitrogen atoms shown in Formula (9).

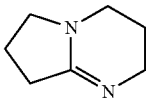
(9)

In another embodiment, the bicyclic organic compound containing nitrogen is 1,8-Diazabicyclo[5.4.0]undec-7-ene containing two nitrogen atoms shown in Formula (10).

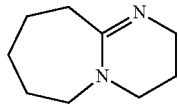
(10)

The aforementioned methods of present invention obtain the VGGF composition with high fiber purity and more three-dimensional linkage structures. The VGGF composition includes a carbon ingredient containing a carbon content of at least 99.9 wt %, and has a metal content of substantially less than 200 ppm. The carbon ingredient has a graphitization degree of at least 75%, preferably at least 85%, and includes fibrous VGGF and non-fibrous carbon, wherein an area ratio of the non-fibrous carbon to the fibrous VGGF measured by a scanning electron microscopy (SEM) is substantially equal to or smaller than 5%. The fibrous VGGF includes graphite fibers having three-dimensional (3-D) linkage structures, wherein the content of the graphite fibers having the 3-D linkage structure in the fibrous VGGF measured by a scanning electron microscopy (SEM) is substantially between 5 area % and 50 area %. In other words, the content of the graphite fibers having the 3-D linkage structure in the fibrous VGGF of the present invention is substantially equivalent to between 5 wt % and 50 wt %. The VGGF of the present invention can be better applied on a material, and the material with the addition of the VGGF has better efficacy for applications in electronic devices, thus meeting the advanced industrial requirements.

Referring FIG. 1, FIG. 1 is a schematic diagram showing a conventional VGCF reaction apparatus used in embodiments of the present invention. The present invention uses the VGCF reaction apparatus (as shown in FIG. 1) disclosed by U.S. Pat. No. 7,374,731B2 entitled "Reaction apparatus for producing vapor-grown carbon fibers and continuous production system thereof", which is incorporated herein by reference. It is noted that U.S. Pat. No. 7,374,731B2 has the same assignee as this application. The present invention keeps a smooth reaction flow field in the apparatus for preventing catalyst and carbon fibers from being stuck on an inner wall of the apparatus to result in apparatus blockage or production interruption, and further uses a proper recipe to produce the VGGF composition with high fiber purity and more three-dimensional linkage structures, followed by a high-temperature graphitization treatment on the carbon fibers composition produced, such as a high-temperature graphitization treatment with 2800-3200° C., thereby making the crystalline structures thereof more complete and removing the metal impurities therein. On industrial applications, the VGGF composition of the present invention may further undergo a cutting process to increase its dispersibility. For example, when being applied as an additive for a lithium ion battery electrode material, the lengths of the VGGF are frequently cut to 5-10 μm so as to be well dispersed within the electrode active material for making their effects more apparent. The fibrous VGGF composition produced by the present invention shows an elongated hollow multi-layered structure formed by wrapping graphite with a high fiber purity having a carbon hexagonal net plane, and has an averaged outer diameter in a range substantially between 50 nm and 200 nm, an averaged aspect ratio in a range substantially between 10 and 5000, a carbon content of at least 99.9 wt %, a graphitization degree of at least 75%, preferably at least 85%, and an area ratio of the non-fibrous carbon to the fibrous VGGF which is substantially equal to or smaller than 5% measured by the SEM. The non-fibrous carbon is connected to, overlapped with or separated from the fibrous VGGF. The fibrous VGGF composition further contains graphite fibers having the 3-D linkage structure of which the content is substantially between 5 area % and 50 area % in the fibrous VGGF measured by the SEM. The VGGF composition has a water content of substantially less than 0.2 wt %, and a metal content of substantially less than 200 ppm. The VGGF composition of the present invention has good thermal and electrical conductivities, and high strength, and a pasty material formed by uniformly mixing N-Methyl-2-pyrrolidone (NMP) with 30 wt % of the VGGF composition has a volume resistance of substantially smaller than 50 Ω-cm, and good oxidation resistance. When a thermogravimetric analyzer (TGA) is used for analysis under test conditions including a temperature increasing rate of 10° C./min and an air flow rate ranged between 10 ml/min and 20 ml/min, a thermal decomposition onset temperature of the VGGF composition is substantially greater than 700° C. Hence, the VGGF composition of the present invention is suitable for use in energy materials, such as, an additive for a lithium ion battery electrode material, or a composite material with high thermal and electrical conductivities and high strength, thereby meeting the advanced industrial requirements.

As shown in FIG. 1, the reaction apparatus of the present invention includes a vertical tubular structure 100 and a heater 150. The vertical tubular structure 100 is mainly composed of an outer tube 110 and an inner tube 120, and the material thereof can be such as aluminum oxide, silicon carbide, quartz, mullite or silicon nitride. The reaction apparatus is mainly featured in installing a plurality of holes 130a on the tube wall of the lower portion of the inner tube 120a, and a plurality of holes 130b on the tube wall of the upper portion of the inner tube 120b, thereby directing carrier gas to a center of the inner tube 120 of the reaction apparatus for increasing the effect for mixing the carrier gas and raw material gas, and meanwhile, further preventing carbon fibers and catalyst from adhering on the tube wall of the inner tube 120 to result in a unsmooth flow field, and even apparatus blockage or production interruption. A thermal-conductive material is filled between the inner tube 120 and the outer tube 110 for increasing heat conductive efficiency. The present invention uses a floating catalyst method to continuously producing VGCF, in which a low molecular hydrocarbon compound is used as a raw material, such as an aromatic/aliphatic hydrocarbon. The aliphatic hydrocarbon can be such as methane, ethylene, acetylene, propane, liquefied petroleum gas, butane, butene or butadiene, etc., and the aromatic hydrocarbon can be such as benzene, toluene, xylene or styrene etc. The floating catalyst method uses reductive gas as the carrier gas, such as hydrogen, and has a high-temperature pyrolysis reaction therein to form VGCF via the transition metal catalysts, such as iron, nickel or cobalt ultra-fine nano-particles, and the co-catalyst of sulfur, wherein the ultra-fine nano-particles may come from the transition metal (iron, nickel or cobalt) compounds, for example, ferrocene ($Fe(C_5H_5)_2$) or nickelocene $C_{10}H_{10}Ni$, and the sulfur compounds can be such as thiophene ($C_4H_4S$), and the reaction temperature is between 800° C. and 1300° C. The reaction efficiency and the product quality are related to the recipe and process conditions. The following embodiment is used as an example for explaining the recipe and process conditions for producing a VGGF composition with high fiber purity and more three-dimensional linkage structures, but the present invention is not limited thereto.

Hereinafter, FIG. 1 is used to explain the manufacturing method of the VGGF composition according to embodiments of the present invention.

Embodiment 1

At first, after raw material gas is delivered from a raw material/catalyst gas source 200 to a mixer 210 and is uniformly mixed with a portion of carrier gas, the reaction gas composed of the raw material gas and the carrier gas is delivered to a pre-heater 160 for pre-heating to 300° C. Thereafter, the reaction gas pre-heated is introduced into the reaction tube via a guide tube 170 for reaction, and meanwhile, the other portions of the carrier gas are delivered respectively to the area between the inner tubes 120a/120b and the outer tube 110; to the thermal-conductive material 140 between the inner tube and the outer tube 110, while the heater 150 is heating the outer tube 110 and the thermal-conductive material 140. After being heated by the thermal-conductive material 140, the carrier gas injects into the inner tubes 120a and 120b through the holes 130a and 130b to mix with the raw material gas. The VGCF produced is collected by the product-collecting system 400, and the effluent gas is recycled by the carrier-gas recycling system 500.

The specification and operation conditions of the reaction apparatus 100 and the results thereof are listed as follows:

(1) inner tube 120: an alumina tube of 20 cm inner diameter; 24 cm outer diameter; and 200 cm long;

(2) outer tube 110: an alumina tube of 30 cm inner diameter; 34 cm outer diameter; and 200 cm long;

(3) holes 130a: location: spaced from the top end of the reaction tube at the distance of 35 cm; extending downwards for 15 cm; hole size: 2 mm diameter; hole distance: 1 cm;

(4) holes 130b: location: spaced from the top end of the reaction tube at the distance of 51 cm; extending downwards for 30 cm; hole size: 2 mm diameter; hole distance: 1 cm;

(5) division plate 122: an alumina ring of 20 cm inner diameter; 30 cm outer diameter; and 1 cm thick; location: spaced from the top end of the reaction tube at the distance of 50-51 cm;

(6) thermal-conductive material 140: an alumina hollow cylinder (0.8 cm inner diameter; 1.0 cm outer diameter; and 1.2 cm long);

(7) heater 150: 1150° C. control temperature;

(8) raw material gas supply: reaction (raw) material composition: 95 wt % toluene, 2 wt % ferrocene; 2 wt % ethyl 3-oxobutanoate, 0.5 wt % bis(dimethylthiocarbamyl)sulfide, 0.5 wt % triethylenediamine; reaction material flow rate: 50 ml/min (liquid phase at 25° C., 1 ATM; entering the reaction system after vaporization);

(9) carrier gas: hydrogen; flow rates: 20 L/min (via the guide tube 170), 30/min (via the holes 130a); and 100 L/min (via the holes 130b);

(10) reaction time: two hours: continued until the supply of raw material gas is stopped, few deposits attached to the tube wall;

(11) products: VGCF collected in a product-collecting system 400 after the above reaction.

Thereafter, a high-temperature heat treatment is performed on the VGCF under 3000° C. in argon (Ar) atmosphere, so as to obtain the highly graphitized VGGF composition of the present invention.

In the below, the features of the VGGF composition of the present invention are analyzed.

Figure 3:
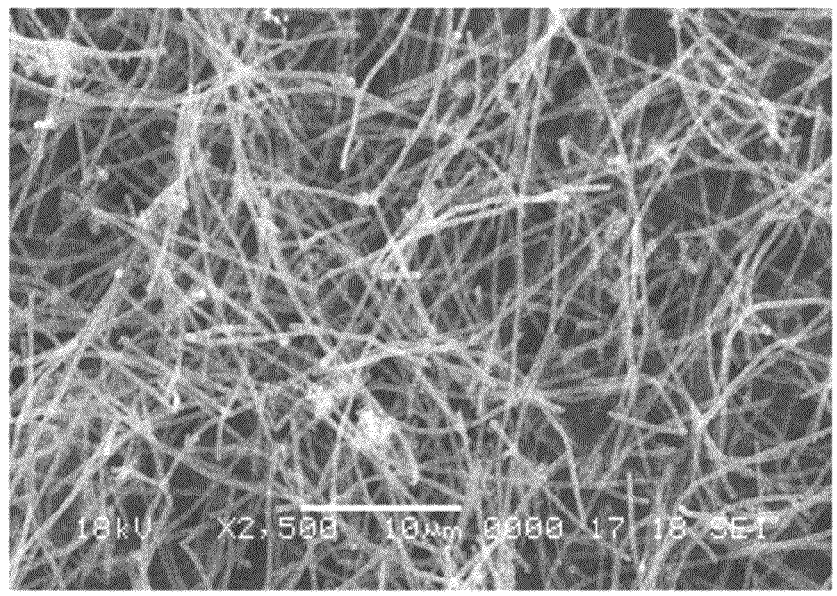
FIG. 3 is a SEM diagram of a VGGF composition according to an embodiment of the present invention.
Figure 4:
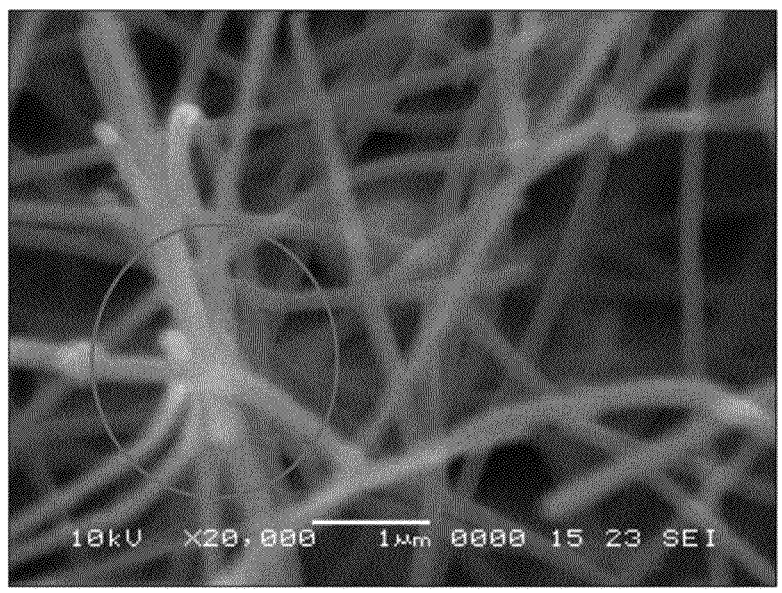
FIG. 4 is another SEM diagram of the VGGF composition according to the embodiment of the present invention.

Referring to FIG. 3, FIG. 3 is a SEM diagram of the VGGF composition according to the embodiment of the present invention. It can be known from FIG. 3 that the VGGF composition of this embodiment is mostly formed from fibrous VGGF, wherein the area ratio of the non-fibrous carbon to the fibrous VGGF is about 1.2%. The outer diameters of the fibrous VGGF of this embodiment are about 50 nm-200 nm, and the averaged outer diameter thereof is about 110 nm, and the aspect ratio thereof is about 180. Besides the shape of straight line, the fibrous VGGF also includes elongated VGGF in the shape of 3-D linkage structure. Referring to FIG. 4, FIG. 4 is another SEM diagram of the VGGF composition according to the embodiment of the present invention, wherein the VGGF with a 3-D linkage structure is shown. It can be known from FIG. 3 SEM diagram that the content of the graphite fibers having the 3-D linkage structure in the fibrous VGGF is about 22 area %.

Figure 5:
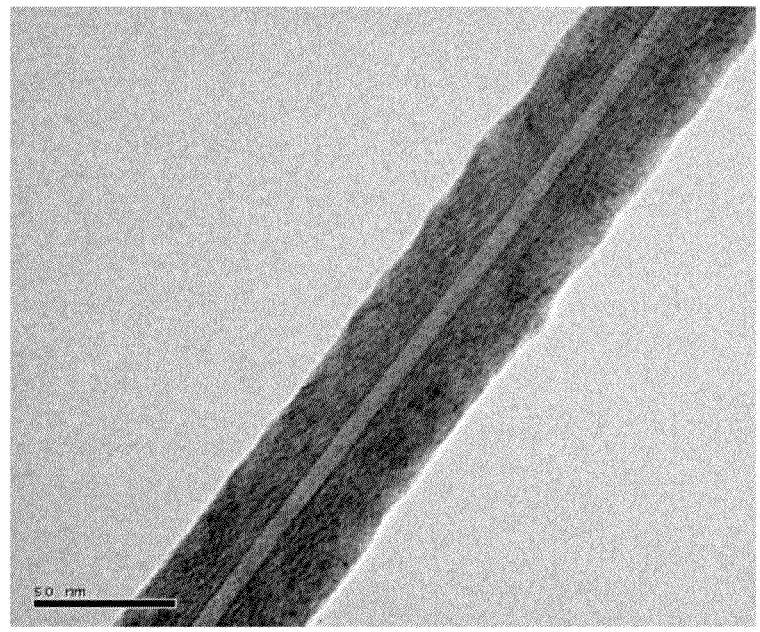
FIG. 5 is a transmission electron microscope (TEM) diagram of the VGGF composition according to the embodiment of the present invention.

Referring to FIG. 5, FIG. 5 is a transmission electron microscope (TEM) diagram of the VGGF composition according to the embodiment of the present invention. It can be known from FIG. 5 that the fibrous VGGF in the VGGF composition of this embodiment have an elongated hollow multi-layered structure.

Figure 6:
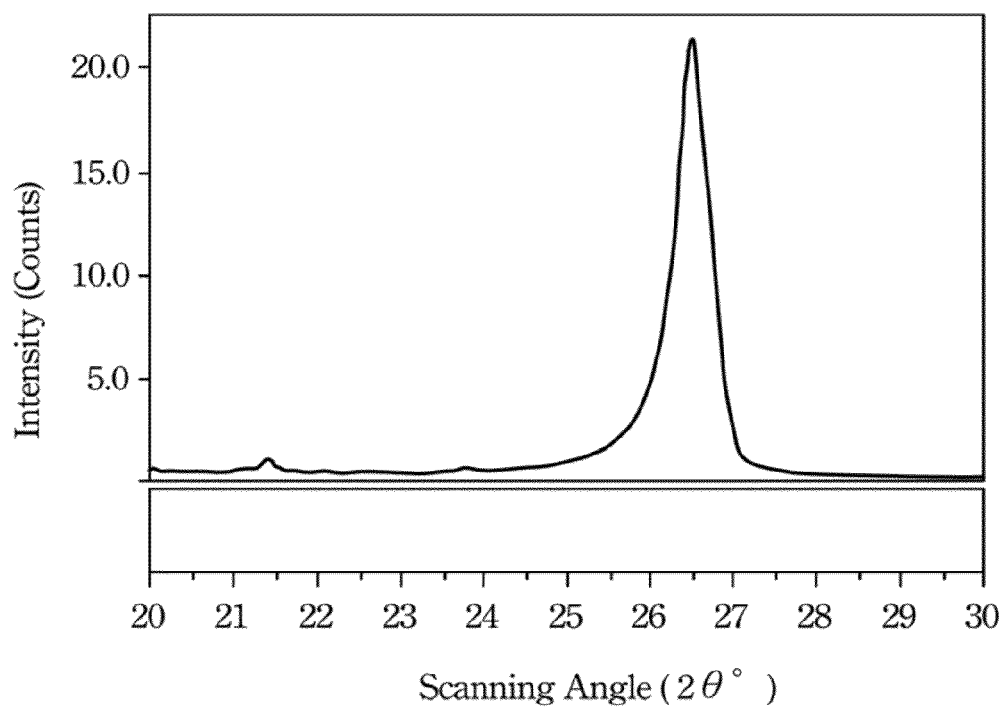
FIG. 6 is an X-ray diffraction (XRD) diagram of the VGGF composition according to the embodiment of the present invention.

Referring FIG. 6, FIG. 6 is an X-ray diffraction (XRD) diagram of the VGGF composition according to the embodiment of the present invention. By using Bragg's law, it can be calculated from the result shown in FIG. 6 that the graphitization degree of the VGGF composition is about 95.4%

Further, from the analysis of elements, it can be known that the carbon content of the VGGF composition of this embodiment is 99.99%. From the ICP-AES (Inductively Coupled Plasma with Atomic Emission Spectrometry) analysis, it can be known that the iron content of the VGGF composition of this embodiment is 35.9 ppm, and the contents of other metals thereof are not detected. From the water content analysis, it can be known that the water content of the VGGF composition of this embodiment is 0.05%. When a TGA is used for analysis under test conditions including a temperature increasing rate of 10° C./min and an air flow rate of 10-20 ml/min, the thermal decomposition onset temperature of the VGGF composition of this embodiment is 752° C. The volume resistance of the pasty material formed by uniformly mixing N-Methyl-2-pyrrolidone (NMP) with 30 wt % of the VGGF composition of this embodiment is 15 Ω-cm.

Embodiments 1-6 with different raw material compositions, reaction conditions and results are shown in Table 1.

(6) products: carbon fibers collected in a collecting system 60 after the above reaction. Thereafter, a high-temperature heat treatment is performed on the carbon fibers under 2750° C. in argon (Ar) atmosphere, so as to obtain the VGCF composition of the comparative example.

Figure 7:
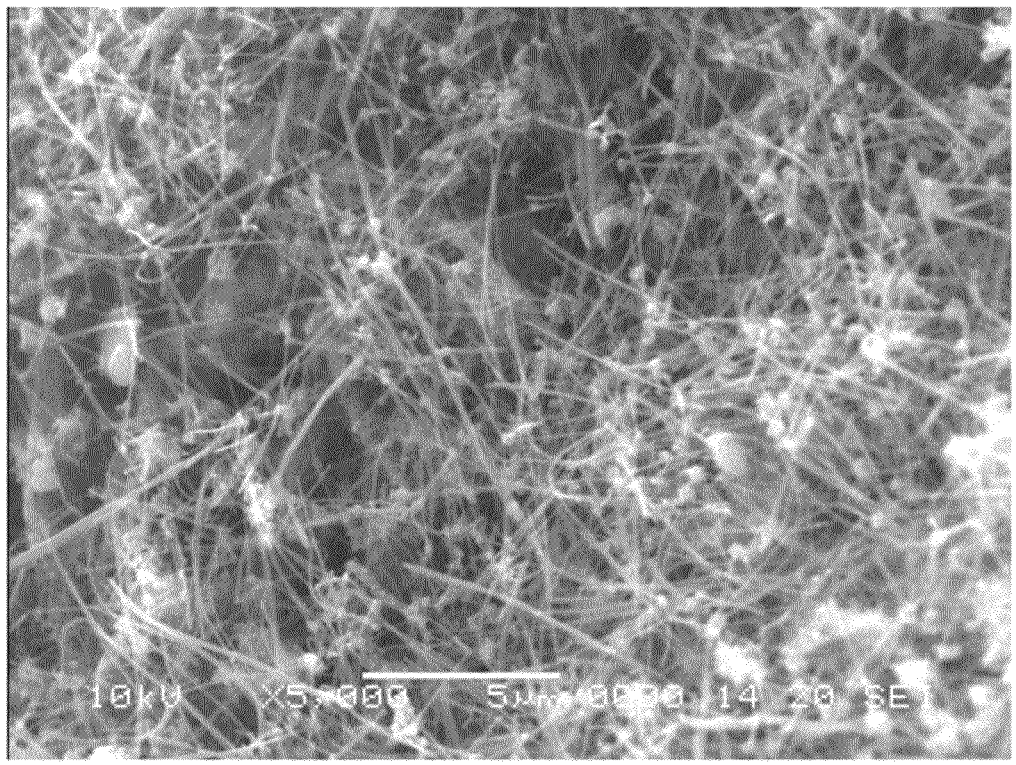
FIG. 7 is a SEM diagram of a VGCF composition of the comparative example.

Referring to FIG. 7, FIG. 7 is a SEM diagram of a VGCF composition of the comparative example. It can be known from FIG. 7 that the VGCF composition of the comparative example has many non-fibrous impurities, wherein the area ratio of the non-fibrous carbon to the fibrous VGCF is about 19.2%. The fibrous VGCF having a 3-D linkage structure in the comparative example is about 3 area %. An averaged outer diameter of the fibrous VGCF of the comparative example is

TABLE 1

Figure 2:
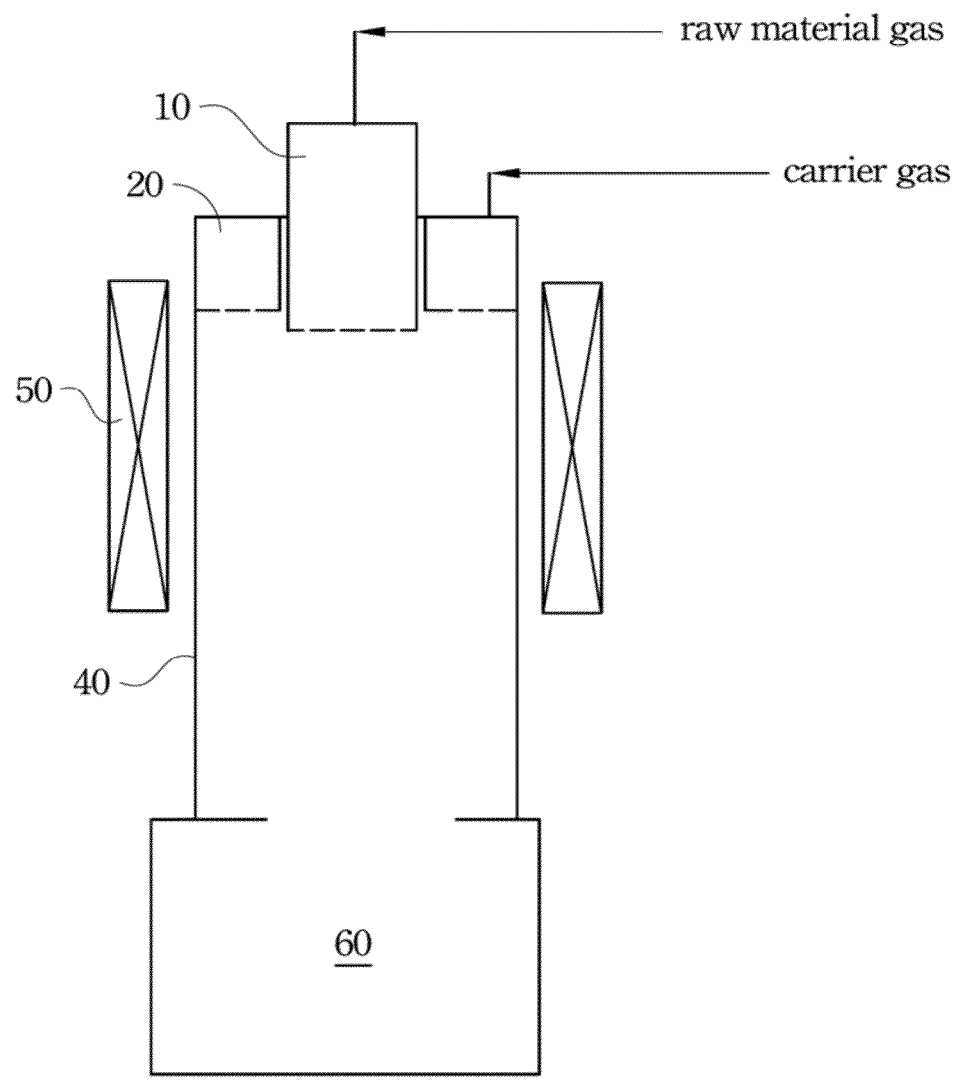
FIG. 2 is a schematic diagram showing another conventional VGCF reaction apparatus used in a comparative example.

|  |  | Embodiments | | | | | | Comparative examples | | | | |
|---|---|---|---|---|---|---|---|---|---|---|---|---|
|  |  | 1 | 2 | 3 | 4 | 5 | 6 | 1 | 2 | 3 | 4 | 5 |
| Reaction apparatus | | FIG.-1 | FIG.-1 | FIG.-1 | FIG.-1 | FIG.-1 | FIG.-1 | FIG.-2 | FIG.-1 | FIG.-2 | FIG.-1 | FIG.-1 |
| Reaction temperature (° C.) | | 1150 | 1150 | 1150 | 1150 | 1150 | 1150 | 1150 | 1200 | 1150 | 1150 | 1150 |
| Hydrocarbon (wt %) | Toluene | 95 | 93 | 94 | 94 | 93 | 96 | | | | 95 | 95 |
| | Xylene | | | | | | | 96 | 96 | 94 | | |
| Catalyst (wt %) | Ferrocene | 2 | 4 | 2 | 1 | 1 | 3.4 | 4 | 2 | 2 | 4 | 3 |
| Co-catalysts (wt %) | Thiophene | | | | | | | | 2 | 3 | | |
| | Ethyl 3-oxobutanoate | 2 | 1 | | 4 | | | | | | | |
| | tert-Butyl acetoacetate | | | 3 | | 2 | 0.2 | | | | 1 | |
| | Bis(dimethylthio-carbamyl)sulfide | 0.5 | 1 | | | | 0.2 | | | | | |
| | 2,2'-Dithio-bis(benzothiazole) | | | 0.5 | 0.8 | 2 | | | | | | 1 |
| | Triethylenediamine | 0.5 | 1 | | | 2 | | | | | | |
| | 1,5-Diazabicyclo[4.3.0]non-5-ene | | | 0.5 | 0.2 | | 0.2 | | | 1 | | 1 |
| Graphitization temperature (° C.) | | 3000 | 2950 | 2850 | 3000 | 2950 | 2850 | 2750 | 2750 | 2850 | 2950 | 3000 |
| Product | Carbon content (wt %) | 99.99 | 99.91 | 99.93 | 99.98 | 99.93 | 99.92 | 99.62 | 99.63 | 98.09 | 99.83 | 99.86 |
| | Graphitization degree (%) | 95.4 | 90.1 | 83.2 | 93.0 | 88.6 | 78.1 | 65.3 | 70.1 | 75.5 | 87.0 | 93.1 |
| | Non-fibrous carbon/fiber (A %) | 1.2 | 2.3 | 3.6 | 4.0 | 3.3 | 4.5 | 19.2 | 10.2 | 25.9 | 11.3 | 6.5 |
| | Fibrous average diameter (nm) | 110 | 102 | 115 | 119 | 109 | 125 | 89 | 105 | 100 | 115 | 109 |
| | TGA decompose onset temp. (° C.) | 752 | 736 | 719 | 746 | 733 | 710 | 652 | 694 | 687 | 695 | 698 |
| | 3-D fiber/total fiber (A %) | 22 | 48 | 33 | 16 | 18 | 8 | 3 | 1 | 1 | 4 | 4 |
| | Water content (wt %) | 0.05 | 0.01 | 0.02 | 0.01 | 0.02 | 0.03 | 0.21 | 0.15 | 0.31 | 0.06 | 0.05 |
| | Metal content (ppm) | 36 | 55 | 130 | 48 | 71 | 170 | 2010 | 1158 | 251 | 82 | 61 |

In the below, comparative examples are used for illustrating the advantages of the present invention.

Comparative Example 1

Referring to FIG. 2, FIG. 2 is a schematic diagram showing another conventional VGCF reaction apparatus used in a comparative example. The comparative example used a conventional apparatus of which the specification and operation conditions are described as follows.

(1) reaction tube 40: an alumina tube of 20 cm inner diameter; 24 cm outer diameter; and 200 cm long, (2) heater 50: 1150° C. control temperature;

(3) reaction material composition: raw material composed of 96 wt % xylene, 4 wt % ferrocene; reaction material flow rate: 50 ml/min (liquid phase at 25° C., 1 ATM; entering the reaction system after vaporization);

(4) carrier gas: hydrogen; flow rates: 20 L/min (via a guide tube 10), 100 L/min (via an inlet 20);

(5) reaction time: production interruption in about two hours due to reactor blockage; a large amount of deposits attached to the tube wall;

about 89 nm; the carbon content thereof is 99.62%; the graphitization degree thereof is about 65.3%. When a TGA is used for analysis under test conditions including a temperature increasing rate of 10° C./min and an air flow rate of 10-20 ml/min, the thermal decomposition onset temperature of the VGGF composition of this embodiment is 652° C. The water content of the VGCF composition of the comparative example is 0.21%, and the iron content thereof is 2010 ppm. The volume resistance of the pasty material formed by uniformly mixing N-Methyl-2-pyrrolidone (NMP) with 30 wt % of the VGCF composition of the comparative example is 138 Ω-cm.

Comparative examples 1-5 with different VGCF reaction apparatuses, raw material compositions, reaction conditions and results are also shown in Table 1.

In comparison with the comparative examples, the VGGF compositions obtained in the respective embodiments of the present invention have more carbon fibers with the 3-D linkage structures, higher fiber purity (less non-fibrous carbon), lower impurity content and are advantageous to build more continuous networks in a composite material, and the low iron content and water content are not harmful to the application functions of the composite material. Further, the VGGF composition of the present invention has a higher thermal decomposition onset temperature, and has better oxidation resistance, thus having better application features.

Hereinafter, two application examples are illustrated for explaining the advantages of the embodiment of the present invention.

Application Example 1

Lithium Ion Battery

The VGGF composition of the embodiment of the present invention, the VGCF composition of the comparative sample, and conductive carbon black are respectively used as an additive for a positive electrode active material for manufacturing a positive electrode, and then the positive electrode is assembled as a coin cell. Therefore, respective samples (coin cells) formed from the VGGF composition of the embodiment of the present invention, the VGCF composition of the comparative sample, and the conductive carbon black are compared under a cycle life test and a high C rate test.

The VGGF composition of the embodiment of the present invention is used as an additive for a positive electrode active material for manufacturing a coin cell, and the manufacturing steps are described as follows.

Recipe:
Solid ratios: LiFePO4 (by Formosa Energy & Material Technology Co., Ltd (FEMTC), Taiwan): 89 wt %;
PVDF (by Solvay Solexis, USA): 8 wt %;
VGGF composition (by the embodiment of the present invention): 3 wt %;
Solid/liquid (NMP) ratio: 1/1.5.

Pasty Material Preparation:
The PVDF of the aforementioned ratio is stirred by a blender at 2000 rpm to be first resolved in NMP, and then the rotational speed of the blender is increased to 15000 rpm. The VGGF is gradually added to the solution of the PVDF and NMP which are being stirred until the VGGF are fully dispersed, and then the LiFePO4 is gradually added thereto and stirred for two hours. Thereafter, the rotational speed of the blender is decreased to 70 rpm and maintained for three hours to obtain a uniformly mixed pasty material.

Electrode Fabrication:
The uniformly mixed pasty material is coated on an aluminum foil in a thickness of 200 μm by a scraper, and then the aluminum foil with the pasty material is dried under 120° C. for one hour to remove the solvent, and is rolled to a density of 2.2 g/cm³ by a roller, thereby obtaining a positive electrode plate.

Coin Cell Fabrication:
The positive electrode plate is trimmed and cut into a circular plate of 1.33 cm in diameter by a tablet press machine. A coin cell (sample A) is assembled in a glove box by using the circular plate as a positive electrode; PP as a separator; and 1M LiPF6/EC-DEC(1:1) as electrolyte The VGCF composition of the comparative sample is used as an additive for a positive electrode active material for manufacturing a coin cell, wherein the VGCF composition of the comparative sample is used to replace the VGGF of the embodiment of the present invention, and the remaining recipe and manufacturing steps are similar to those of sample A, thereby obtaining a coin cell (sample B).

Only super-P (the conductive carbon black) is used as an additive for a positive electrode active material for manufacturing a coin cell without adding the VGCF composition of the comparative sample or the VGGF of the embodiment of the present invention, and the recipe is:
Solid ratios: LiFePO4 (by Formosa Energy & Material Technology, Taiwan): 89 wt %;
PVDF (by Solvay Solexis, USA): 8 wt %;
Super-P (by Tmical, Switzerland): 3 wt %;
Solid/liquid (NMP) ratio: 1/1.5.

The remaining manufacturing steps are similar to those of sample A, thereby obtaining a coin cell (sample C).

The battery performance of sample A, sample B and sample C is compared in the below.

Cycle Life Test:
The charge cut-off voltage is 4.2V, the discharge cut-off voltage is 2.5V, and 1 c charge and discharge has been performed for 500 cycles, and the results obtained are:

TABLE 2

| Coin cell | Initial battery capacity (mAh) | capacity retention % after 500 cycles |
|---|---|---|
| sample A | 135 | 92 |
| sample B | 135 | 88 |
| sample C | 132 | 76 |

High C Rate Test:
The charge cut-off voltage is 4.2V, the discharge cut-off voltage is 2.5V, and 1 c charge and 5 c or 15 c discharges has been performed for 100 cycles and 500 cycles, and the results obtained are:

TABLE 3

| Coin cell | Initial battery capacity (mAh) | capacity retention % after 100 cycles (5 c discharge) | capacity retention % after 500 cycles (15 c discharge) |
|---|---|---|---|
| sample A | 135 | 99 | 84 |
| sample B | 135 | 96 | 80 |
| sample C | 132 | 76 | 0 |

It can be known from Table 2 that the cycle life of sample A is longer than those of samples B and C. It can be known from Table 3 that the capacity retention % after cycling tests, sample A is better than those of samples B and C.

Application Example 2

Fuel Cell Bipolar Plate

The VGGF composition of the embodiment of the present invention, the VGCF composition of the comparative sample, and graphite powders are respectively used as an additive and an electrical conductive material for mixing with epoxy resin to form a composite material for manufacturing a fuel cell bipolar plate. Respective samples are compared in aspects of electrical conductivity, thermal conductivity and strength.

The VGGF composition of the embodiment of the present invention is used as an additive for manufacturing a fuel cell bipolar plate, and the manufacturing steps are described as follows.

Recipe:
epoxy resin CN200ELL (by Nan-Ya Plastics, Taiwan): 6.8 wt %;
curing agent PF8090 (by Chang Chiang Chemical, Taiwan): 4.2 wt %;
curing accelerator DBU (by Air Products, USA): 0.5 wt %;
lubricant zinc stearate (produced by Coin Chemical): 0.5 wt %;

coupling agent GLYMO (by Degussa, Germany): 0.5 wt %;

dispersing agent LE208 (by Sin θ-Japan Chemical, Taiwan): 0.5 wt %;

graphite powders KS-150 (by Timcal, Switzerland): 85 wt %; and

VGGF composition (based on the embodiment of the present invention): 2 wt %.

Preparing Procedure:

The mixture of the aforementioned recipe is compounded under 85° C. in a kneader for one hour, and then are smashed and sieved after being taken out of the kneader. Thereafter, the mixture is hot-pressed in a thermal molding machine at 180° C. for one minute, thereby obtaining a fuel cell bipolar plate of 3 mm in thickness (sample D).

The VGCF composition of the comparative sample is used as an additive for manufacturing a fuel cell bipolar plate, wherein the VGCF composition of the comparison sample is used to replace the VGGF of the embodiment of the present invention, and the remaining recipe and manufacturing steps are similar to those of sample D, thereby obtaining a fuel cell bipolar plate (sample E).

Only KS-150 graphite powders are used as the conductive material for manufacturing a fuel cell bipolar plate without adding the VGCF composition of the comparison sample or the VGGF of the embodiment of the present invention, and the recipe is:

epoxy resin CN200ELL (by Nan-Ya Plastics, Taiwan): 6.8 wt %;

curing agent PF8090 (by Chang Chiang Chemical, Taiwan): 4.2 wt %;

curing accelerator DBU (by Air Products, USA): 0.5 wt %;

lubricant zinc stearate (produced by Coin Chemical): 0.5 wt %;

coupling agent GLYMO (by Degussa, Germany): 0.5 wt %;

dispersing agent LE208 (by Sino-Japan Chemical, Taiwan): 0.5 wt %; and graphite powders KS-150 (by Timcal, Switzerland): 87 wt %.

The remaining manufacturing steps are similar to those of sample D, thereby obtaining a fuel cell bipolar plate (sample F).

The electrical conductivity, thermal conductivity and strength of sample D, sample E and sample F are compared in the below.

TABLE 4

| Features | sample D | sample E | sample F |
|---|---|---|---|
| Thermal conductivity (W/mK) | 61 | 46 | 31 |
| Electrical conductivity (S/cm) | 156 | 125 | 103 |
| Bending Strength (psi) | 7660 | 6105 | 4077 |

It can be known from Table 4 that the electrical conductivity, thermal conductivity and strength of sample D are better than those of samples E and F.

Hence, the present invention has a larger amount of graphite fibers having 3-D linkage structures, higher fiber purity (less non-fibrous carbon), lower iron and water contents, so that the number of electrically and thermally conductive networks in a composite material can be greatly increased, the detrimental effect of impurities can be minimized, the performance of the composite material can be improved, and the features of electrical and thermal conductivities and strength of the composite material can be greatly promoted without harming the application functions of the composite material. Further, the energy-purpose materials prepared by using the VGGF composition of the present invention have longer cycle life, better capacity retention and better oxidation resistance.

It is noted that the aforementioned examples of the respective embodiments are merely used as examples for explanation, and do not intend to limit the present invention. Therefore, the applications of the present invention are not limited thereto.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for forming a vapor-grown graphite fibers (VGGF) composition, the method comprising:

preparing a liquid raw material by mixing a hydrocarbon compound, a transition metal compound catalyst and a co-catalyst mixture comprising a coordinating ligand containing a keto-enol tautomerism, an organic compound containing a polysulfide group, a bicyclic organic compound containing nitrogen;

vaporizing the liquid raw material, thereby forming raw material gas; and introducing the raw material gas and hydrogen gas into a tubular reactor for performing a pyrolysis reaction, thereby producing a vapor-grown carbon fibers composition having pure carbon fibers with three-dimensional (3-D) linkage structures; and performing a high-temperature graphitization treatment on the VGCF, thereby forming the VGGF composition.

2. The method of claim 1, wherein the hydrocarbon compound is selected from the group consisting of an aliphatic hydrocarbon compound, an aromatic hydrocarbon compound and a combination thereof, and the aliphatic hydrocarbon is selected from the group consisting of methane, ethylene, styrene, acetylene, propane, liquefied petroleum gas, butane, butene, butadiene and a combination thereof, and the aromatic hydrocarbons is selected from the group consisting of benzene, toluene, xylene, styrene and a combination thereof.

3. The method of claim 1, wherein the transition metal compound catalyst is ferrocene, and the content of the transition metal compound catalyst in the liquid raw material is substantially between 0.1 wt % and 10 wt %.

4. The method of claim 1, wherein the coordinating ligand containing the keto-enol tautomerism has a molecular structure of Formula (I):

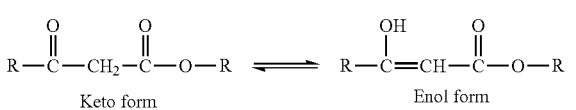

where R is an alkyl group of C1~C6.

5. The method of claim 1, wherein the coordinating ligand containing the keto-enol tautomerism is ethyl 3-oxobutanoate, and the content of the coordination compound containing the keto-enol tautomerism in the liquid raw material is substantially between 0.5 wt % and 5 wt %.

6. The method of claim 1, wherein the organic compound containing the polysulfide group has a molecular structure containing at least three sulfur atoms.

7. The method of claim 1, wherein the organic compound containing the polysulfide group is Bis(dimethylthiocarbamyl) sulfide, and the content of the organic compound containing the polysulfide group in the liquid raw material is substantially between 0.1 wt % and 2 wt %.

8. The method of claim 1, wherein the bicyclic organic compound containing nitrogen has a molecular structure containing at least one nitrogen atom.

9. The method of claim 1, wherein the bicyclic organic compound containing nitrogen is Triethylenediamine, and the content of the bicyclic organic compound containing nitrogen in the liquid raw material is substantially between 0.1 wt % and 2 wt %.

10. The method of claim 1, wherein a reaction temperature of the pyrolysis reaction is substantially between 800° C. and 1300° C.

11. The method of claim 1, wherein a graphitization temperature of the high-temperature graphitization treatment is substantially between 2800° C. and 3000° C.

* * * * *